United States Patent [19]

Yu

[11] Patent Number: 4,983,689

[45] Date of Patent: * Jan. 8, 1991

[54] PROCESS FOR MAKING MACROMOLECULAR MONOMERS OF POLYLACTONES WITH TERMINAL ACRYLOYL UNSATURATION AND BLOCK COPOLYMERS THEREOF

[76] Inventor: Simon H. Yu, Westlake, Ohio

[*] Notice: The portion of the term of this patent subsequent to Dec. 13, 2005 has been disclaimed.

[21] Appl. No.: 283,422

[22] Filed: Dec. 12, 1988

Related U.S. Application Data

[63] Continuation-in-part of Ser. No. 46,818, May 7, 1987, Pat. No. 4,791,189.

[51] Int. Cl.$^5$ .................... C08G 63/08; C08F 218/02
[52] U.S. Cl. .................... 525/412; 525/415; 526/320; 528/354; 528/355; 528/356; 528/357; 560/183; 560/185
[58] Field of Search .............. 525/408, 412, 415; 528/354, 355, 356, 357; 526/320; 560/183, 185

[56] References Cited

U.S. PATENT DOCUMENTS

| | | | |
|---|---|---|---|
| 2,945,012 | 7/1960 | Berens | 526/296 X |
| 4,188,472 | 2/1980 | Chang | 528/75 |
| 4,281,172 | 7/1981 | Knopf | 560/185 |
| 4,368,320 | 1/1983 | Aldinger et al. | 528/355 |
| 4,504,635 | 3/1985 | Weber, Jr. et al. | 525/450 |
| 4,632,975 | 12/1986 | Cornell et al. | 528/354 |
| 4,683,287 | 7/1987 | Koleske et al. | 528/357 |

FOREIGN PATENT DOCUMENTS 2101121 1/1983 United Kingdom.

Primary Examiner—Earl Nielsen
Attorney, Agent, or Firm—Alfred D. Lobo; Nestor W. Shust

[57] ABSTRACT

Preparation of a macromolecular monomer of a lactone having an alpha-beta monoolefinically unsaturated "head" is effected at low temperature with a strong oxonium salt, such as a trialkyloxonium (TAO) hexafluorophosphate catalyst, with essentially no formation of cyclic oligomers and an insignificant amount of diacrylate. Cationic ring-opening polymerization of lactone monomer in conjunction with an unsaturated alcohol (propagator) having an acryloyl or methacryloyl double bond, produces a polylactone macromer having an ethylenic double bond at one end and a hydroxyl group at the other. The polymerization proceeds by polyaddition of the lactone to the OH group which is the propagating species. The macromer so formed allows the preparation of a macromer of block copolymer of the polylactone with a polyether such as epichlorohydrin, using the same TAO catalyst. In such a macromer of block copolymer, the polylactone ester block is next to the double bond, followed by the polyether block. This macromer of block copolymer, in turn, may be copolymerized with commonly available olefinically unsaturated monomers. There is no known method for the preparation of such copolymers with a homomacromer of polylactone, or, a macromer of polylactone-b-polyether. The propagator is a primary or secondary acryloyl or methacryloyl alcohol.

27 Claims, No Drawings

PROCESS FOR MAKING MACROMOLECULAR MONOMERS OF POLYLACTONES WITH TERMINAL ACRYLOYL UNSATURATION AND BLOCK COPOLYMERS THEREOF

CROSS-REFERENCE TO RELATED APPLICATION

This application is a continuation-in-part of Ser. No. 046,818 filed May 7, 1987, now U.S. Pat. No. 4,791,189, issued Dec. 13, 1988.

BACKGROUND OF THE INVENTION

This invention relates to a process for making macromolecular monomers ("macromers" for brevity) of polylactones having an acryloyl or methacryloyl "head" group at one end, and a terminal hydroxyl (OH) group at the other end, essentially quantitatively, producing an insignificant proportion of diacrylate (for example, ethylene glycol dimethacrylate) due to interesterification, and essentially without producing cyclic oligomers. Hereinafter the acryloyl and methacryloyl "head" groups are together referred to as "(meth)acryloyl" groups, and the alcohol used is referred to as a "hydroxyalkyl (meth)acrylate", for convenience and brevity.

The macromer of (meth)acryloyl headed polylactone so formed may be used to initiate block copolymerization with a ring-openable ether, using the same catalyst, yielding a macromer of block copolymer in which the polylactone block is adjacent the terminal double bond, and the OH group is attached to the end of the polyether chain.

This macromer of polylactone-b-polyether block copolymer (structure II herebelow) is then copolymerizable through its head group with an olefinically unsaturated copolymerizable monomer. The copolymerization of the macromer of block copolymer with one or more conventional olefinic monomers generates a "polymacromer" with a saturated hydrocarbon backbone having polylactone-b-polyether branches thus resulting in a graft or comb copolymer in which the polyether blocks are farthest from the backbone. Such copolymerization of the macromer of block copolymer to form comb copolymers, differs from graft copolymerization, in the sequence of formation of the backbone relative to the formation of the graft unit.

In my copending parent application I disclosed the formation of (meth)acryloyl headed macromers of polylactone which always had a polyether spacer, the polylactone chain being intermediate the polyether spacer and the OH propagating group. At the time, it appeared that the presence of the polyether spacer ahead of (that is, preceding) the polylactone chain at the tail end of the macromer was responsible for the substantial absence of diacrylate, and cyclic oligomers in the macromer product. The macromer product had the structure

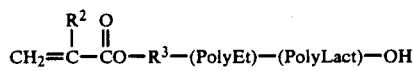  (I)

wherein, the O of the OH group is contributed by the last repeating unit of the polyether;

R$^2$ is H or C$_1$–C$_{20}$ alkyl, preferably lower C$_1$–C$_5$ alkyl, and most preferably methyl;

R$^3$ is selected from a saturated group consisting of branched or linear alkylene, haloalkylene, alkoxyl, haloalkoxyl, each C$_1$–C$_{20}$, aralkylene, haloaralkylene, aralkoxyl, and haloaralkoxyl, each C$_7$–C$_{20}$;

(PolyLact) represents a chain of lactone units; and, (PolyEt) represents a polyether block containing no active hydrogen, i.e. no hydrogen attached to oxygen, nitrogen, or sulfur, and has a number average molecular weight Mn up to about 30,000.

I now know that the highly specific polymerization which yields the substantially diacrylate-free, and cyclic oligomer-free product, essentially quantitatively, is the result of operation at relatively low temperature; and these unexpected results are uniquely derived from the characteristics of the trialkyloxonium (TAO) salt (cationic initiator) I used. By "substantially diacrylate-free" I refer to a macromer product having less than 0.05 percent by weight (% by wt) diacrylate.

This was particularly unexpected because a strong catalyst such as TAO is known to be undesirable for such formation of a macromer of polylactone due to the promotion of deleterious interesterification. More surprising is that the same TAO catalyst may then be used to prepare a macromer of block copolymer, in which the polylactone is blocked to a polyether. Again, this polymerization occurs without the formation of a significant proportion of diacrylic polymer.

The macromer is formed in commercially acceptable yield by the cationic ring-opening polymerization of a lactone in conjunction with (a) a hydroxyalkyl (meth)acrylate (or 'propagator') which functions as the generator of the propagating species (the OH group), and (b) an oxonium salt cationic ring-opening catalyst which has been found uniquely effective at so low a temperature that there is essentially no formation of byproducts, particularly diacrylic species.

U.S. Pat. Nos. 4,281,172 and 4,340,497 to Knopf, and 4,632,975 to Cornell, teach the preparation of macromers of polylactones by end-capping reactions which are known to be notoriously non-quantitative.

U.S. Pat. No. 3,655,631 to Fraser, teaches that lactones are polymerized in the presence of an ethylenically unsaturated amide or ester with a strong organic acid such as halogen activated carboxylic acids or sulfonic acids as catalyst, and a compound having the formula L-CH$_2$OH as initiator, wherein L contains ethylenic unsaturation activated by amide or ester linkages, the ethylenic unsaturation being either CH$_2$=CH< or CH$_2$=CH—. The acid has a pK value of less than 3 in water at 25° C. An acrylic group was exemplified, but the determination of unsaturation of the (meth)acrylic groups by the iodine method is undesirable, and unreliable, hence of questionable probative value. I have been unable to determine unsaturation of the (meth)acrylic groups by the iodine method. Further, as stated in U.S. Pat. Nos. 4,6813,287 and 4,504,635, the macromers prepared according to Fraser's method necessarily contain a large amount of residual acid catalyst. The presence of such acaid catalyst in the product likely produces degradation and decrease of shelf life or pot life of coating systems produced from the macromer.

In the '365 patent to Fraser, the resulting terminally unsaturated polylactones were copolymerized with an ethylenically unsaturated monomer, for example, vinyl acetate; and, were used as plasticizer for poly(vinyl chloride) (PVC). But the teaching as to any ethylenically unsaturated group is not as broadly applicable as at first appears. For example, when the ethylenically unsaturated group is a vinyl ether group, the alkenyl alcohol, such as 2-hydroxyether vinyl ether ($CH_2=CH-O-CH_2-CH_2OH$) or 4-hydroxybutyl vinyl ether, is an ineffective propagator. The vinyl ether group of the alkenyl alcohol does not survive under the conditions of cationic ring-opening polymerization of lactones and undergo carbocationic polymerization. As a result, the lactone polymers do not have an ethylenically unsaturated head group.

Further, since Fraser was unaware that the OH group could function as the propagating species, he attributed his polymerization to the ester or amide linkage of the alcohol. Thus, the possibility of using the polylactone polymer he made, to initiate a block polymerization with a polyether could not have occurred to him, even if he was prepared to use a different catalyst to do so. Still further, it is only because it is now known that the same lactone ring-opening catalysts are uniquely effective in the ring-opening polymerization of alkylene oxides, was it possible to arrive at the concept of using an —OH terminated polylactone with an ethylenically unsaturated head group, as the propagator for the formation of a macromer of polylactone-b-polether macromer, which, in turn, could then be copolymerized with a copolymerizable monoolefinically unsaturated monomer.

The significance of low temperature operation can best be appreciated by noting the uniformly high temperatures used for lactone polymerization in the prior art. Thus, U.S. Pat. No. 4,188,472 to Chang, discloses the polymerization of lactone in the presence of hydroxyalkyl (meth)acrylate with tetrabutyl titanate as the catalyst at 130° C.

U.S. Pat. No. 4,368,320 to Aldinger, discloses the polymerization of lactone in the presence of hydroxyalkyl (meth)acrylate with dialkyl tin oxide or glycolate at a temperature of from about 110° C. to about 125° C.

To cope with the problem of residual catalyst and minimize its effect, U.S. Pat. Nos. 4,504,635 and 4,6833,287 to Weber, Jr. and Koleske, respectively, disclose the polymerization of lactone in the presence of hydroxyalkyl (meth)acrylate with less than 200 ppm of catalyst. Preferred catalysts are stannous octoate, dibutyl tin dilaurate, and other tin compounds; also, alkyl titanates such as butyl titanate. But the reaction has to be carried at a temperature in the range from about 100° C. to about 140° C., and though less than 2% by wt of diacrylate is said to be formed, no mention is made as to how this level of diacrylate was determined.

UK Patent Application GB No. 2,101,121A to Okitsu and Watanabe discusses numerous attempts to polymerize a lactone and obtain a polylactone-modified acrylic polyol.

Particularly decrying the use of organotin or organotitanate catalyst because of the per se polymerization of the acrylic ester at the minimum 130° C. required, they teach the polymerization of lactone in the presence of hydroxyalkyl (meth)acrylate with stannous halide at a temperature as low as 80° C.-130° C. with only a small amount (100 ppm) of catalyst, resulting in only slight formation of the diacrylate, and little interesterification reaction. Though advocating the use of a reaction temperature at the low end of the range, they provide examples only at 120° C. Despite this relatively high temperature, the rate of reaction is so slow that the fastest reaction requires 8 hr (hours).

It is known that oxonium salts are effective in ring-opening polymerization of oxirane compounds (see U.S. Pat. No. Re 31,577 to Riew); and that a hydroxyalkylacrylate provides a vinyl functional head group in such a polymerization (see U.S. Pat. No. Re 31,468). It so happens that triethyloxonium hexachloroantimonate and triethyloxonium tetrafluroborate are known to be effective in the polymerization of lactones (see "Catalytic Polymerization of epsilon-caprolactone" by Burba, C et al Ger. Offen. DE No. 2123968) but not for providing an unsaturated head group. Since it is critically important that my macromer possess the (meth)acrylyl head group, the possibility of using an oxonium salt in conjunction with the hydroxyalkyl(meth)acrylate propagator was given little weight. Also, it is well known that, because the mechanisms are generally different, an effective catalyst for cationic ring-opening an oxirane to form a polyether, is not likely to be effective for ring-opening a lactone to form a polyester, and vice versa. It was simply the availability of the particular catalysts which instigated the investigation of their activity in conjunction with a hydroxyalkyl-(meth)acrylate propagator which initiated the ring-opening polymerization of lactones, and such activity fortuitously was found to be high.

It is to be noted that the macromers of this invention are formed by cationic ring-opening and not carbocationic polymerization, though both are classified as cationic polymerizations and may even use the same cationic initiator. The cationic ring-opening of a lactone involves the opening of strained rings of cyclic monomers and the propagating species is an acyl carbonium ion; carbocationic polymerization involves substituted olefinic monomers where the propagating species is a carbenium ion.

SUMMARY OF THE INVENTION

It has been discovered that a polylactone macromer is produced, under mild conditions, by the cationic ring-opening polymerization of a lactone in conjunction with an alcohol having an unsaturated (meth)acryloyl head group, and using an oxonium salt as the cationic ring-opening catalyst. The macromer has a (meth)acryloyl functional head group at one end and a hydroxyl (OH) group at the other. Despite use of such a strong oxonium salt catalyst, there is essentially no formation of a di(meth)acrylic species formed by interesterification, no formation of cyclic oligomers, and the ethylenic double bond of the alcohol does not undergo carbocationic polymerization under the acidic conditions required for the cationic ring-opening polymerization of the lactone used. Because of a relatively low polymerization temperature, there is insignificant thermal self-polymerization of the (meth)acrylic head group. The polymerization proceeds by polyaddition of the lactone to the OH group which is the propagating species.

It is therefore a general object of this invention to provide a process for the manufacture of a polylactone macromer having an acryloyl functional head group and a hydroxyl group at the tail, comprising, polymerizing (A) a cationically ring-openable lactone having the structure:

wherein, n is an integer chosen from 1, 3, 4 and 5;

$R^1$ is a group selected from hydrogen, $C_1$–$C_{20}$ alkyl (having from 1 to about 20 carbon atoms), preferably $C_1$–$C_6$ lower alkyl, cycloalkyl, alkoxy and phenyl, and the number of $R^1$ groups which are H is at least (n+2); and, (B) an ethylenically unsaturated primary or secondary (meth)acryloyl alcohol wherein the ethylenic unsaturation is adjacent a carbonyl group as in the structure $$CH_2=\underset{R^2}{C}-\underset{O}{\overset{\|}{C}}O-R^3-OH \qquad (II)$$

wherein $R^2$ and $R^3$ have the connotation hereinabove; and, (C) an oxonium salt cationic initiator while maintaining a temperature in the range from about 10° C. to about 80° C.; so as to produce a polylactone macromer substantially free from di(meth)acrylic species, said macromer having the structure $$R-(M)_m-OH \qquad (LM)$$

wherein R represents the residue of said alcohol having a (meth)acrylic group, the structure being written to emphasize the terminal OH group, the O atom for which is from the last repeating polyester unit, M represents the polyester repeating unit of at least one said lactone which is ring-opened, and, m represents an integer in the range from 2 to about 500, more preferably from 2 to about 300.

The macromer of polylactone so obtained may also be written $$CH_2=\underset{R^2}{C}-\underset{O}{\overset{\|}{C}}O-R^3-(PolyLact)-OH \qquad (LM')$$

This macromer may be used to form a block macromer, by sequentially polymerizing a ring-openable cyclic ether, using the same catalyst, to produce a macromer block copolymer in which a polyether block spaces the OH group from the polylactone chain, the macromer block copolymer having the structure $$CH_2=\underset{R^2}{C}-\underset{O}{\overset{\|}{C}}O-R^3-(PolyLact)-(PolyEt)-OH \qquad (III)$$

wherein, the 0 of the OH group is contributed by the last repeating unit of the polyether.

It has also been found that a random comb-shaped copolymer of macromer may be prepared by polymerizing (a) the macromer of polylactone (LM') with an olefinically unsaturated monomer so as to have the structure $$+CH_2-\underset{\underset{COOR^3+PolyLact+OH}{|}}{\overset{R^2}{\underset{|}{C}}\,}]_{n'}+M_o]_{n''} \qquad (IV)$$

wherein $M_o$ represents the olefinically unsaturated monomer;

$n'$ represents an integer in the range from 1 to about $10^4$, preferably 1–$10^3$ and refers to the number of pendant OH-terminated polyester chains; and, $n''$ represents an integer in the range from 1 to about $10^5$, more preferably 1–$10^4$; and, (b) the macromer block copolymer with an olefinically unsaturated monomer so as to have the structure $$+CH_2-\underset{\underset{COOR^3+PolyLact)-b-(PolyEt)+OH}{|}}{\overset{R^2}{\underset{|}{C}}\,}]_{n'}+M_o]_{n''} \qquad (V)$$

Still other specific objects of this invention are to provide (a) a macromer of polylactone which is used in radiation-curable polyurethanes to be used in coatings, adhesives, inks, printing plates, and binders; (b) macromers of block copolymers and comb copolymers of macromers with olefinically unsaturated olefins which are useful as compatibilizers and impact modifiers in numerous polymers such as poly(vinyl chloride) (PVC), and polyblends, for example, of PVC with segmented copolyesters disclosed in copending U.S. patent application Ser. No. 07/038,1003 of Yang; and (c) macromers of block copolymers and comb copolymers which are convcenently polymerized for use as potting compounds.

DETAILED DESCRIPTION OF PREFERRED EMBODIMENTS

Most preferred among the lactones having structure (L), are the seven-membered rings, such as epsilon-caprolactone wherein n is 4, and at least 6 of $R^1$s are H, with the remainder of the $R^1$s being substituents selected from those identified hereinabove, provided the total number of C atoms in the —$(CR^1_2)_4$— groups does not exceed 12. Preferred substitutents are $C_1$–$C_{12}$ alkyl, for example, monoalkyl epsilon-caprolactones like methyl epsilon-caprolactone, or a mixture of isomeric methyl epsilon-caprolactones, or a mixture of isomeric methyl epsilon-caprolactones with epsilon-caprolactone, and dodecyl epsilon-caprolactone; also, dialkyl epsilon-caprolactones in which the two alkyl groups are substituted on the same or different C atoms, but not both on the epsilon C atom; and, trialkyl epsilon-caprolactones in which two or three C atoms in the lactone ring are substituted, but the epsilon C atom is not substituted.

Also usable are lactones having more than 6 C atoms in the ring, such as zeta-enantholactone and eta-caprylolactone, but they are less preferred. Substituted and unsubstituted epsilon-caprolactone are obtained by oxidizing the corresponding cyclohexanone, and the zeta-enantholactone from cycloheptanone.

Most preferred is a lactone selected from the group consisting of epsilon-caprolactone, beta-propiolactone, beta-butyrolactone, and delta-valerolactone.

The cationic ring-opening polymerization disclosed herein occurs because of the specific TAO strong acid catalyst used with the (meth)acryloyl alcohol, specifically, a hydroxyalkyl ester of acrylic or methacrylic acid, used to function as the "spacerless" chain propagator for a ring-openable lactone. This reaction was not expected to produce the macromer of this invention with the TAO catalyst because it was not realized that the (meth)acryloyl group of an alcohol, without a polyether spacer (hence "spacerless") would neither polymerize prematurely via carbocationic polymerization, nor interfere with the lactone to be ring-opened by the TAO catalyst. Allyl and styryl groups have a proclivity to undergo carbocationic polymerization (see *Carbocationic Polymerization*, by Kennedy, J. P. and Marechal, E., Wiley & Sons, 1982). The problem is exacerbated because the unwanted carbocationic polymerization and the desired ring-opening polymerization of cyclic monomers are commonly catalyzed. The difficulty of preserving the (meth)acryloyl group which has a high tendency to self-polymerize thermally, unexpectedly was overcome.

Further, the well-known interesterification which occurs during ring-opening polymerization of a lactone, is surpressed. Were it not, chains having a (meth)acryloyl group at each end, or no (meth)acryloyl group at all, would result. The former would result in crosslinking in a subsequent polymerization reaction. Still further, most strong acid catalysts for the ring-opening polymerization of lactones, adversely affect the stability and pot life of the macromer, not to mention adding unwanted color, and are therefore restricted to use in so low a concentration as to be ineffective for the purpose at hand. TAO is not so restricted.

Macromers of this invention have a number average mol wt Mn in the range from about 200 to about 30,000 though even higher mol wts up to about 50,000 may be formed, if desired. The mol wt is controlled by the ratio of lactone to acryloyl alcohol. Because the polymerization proceeds via polyaddition, a designed (desired) mol wt may be obtained.

The term "macromer" is used herein to denote at least one of the ring-opened lactones specified by the above structure (L) which, when polymerized is terminated at one "head" end with an ethylenically unsaturated, or (meth)acrylyl group. If the macromer is formed from a single lactone it is referred to as a "homomacromer"; if from more than one comonomer which appears randomly, it is referred to as a "macromer copolymer"; and, if a copolymer is specifically formed by sequential copolymerization so that it consists of definable polymer blocks, it is referred to as a "macromer block polylactone".

To facilitate this ring-opening polymerization which has "living" characteristics, so that the (meth)acrylyl head group survives the reaction without forming undesired by-products, it is essential that one use (i) a catalytic amount of the TAO catalyst (initiator) which is an oxonium salt of tetrafluoroborate, or hexafluorophosphate, or hexafluoroantimonate, or, hexachloroantimonate, or, hexafluoroarsenate; and, (ii) a primary or secondary alcohol represented by the structure I, which alcohol is at least partially soluble, and more preferably, is completely soluble in the reaction mass, with or without a solvent.

The acryloyl polylactone macromer is formed by the action of a cationic ring-opening catalyst identified hereinabove with an alcohol with an acrylic head (the propagator), under mild reaction conditions, namely a temperature in the range from about 10° C. to about 80° C., and more preferably from about 25°-70° C., at ambient or slightly elevated pressure.

Most preferred is a (meth)acryloyl alcohol selected from the group consisting of 2-hydroxyethyl (meth)acrylate, hydroxypropyl (meth)acrylate, and 4-hydroxybutyl (meth)acrylate.

The catalyst for synthesis of my macromer is used in an amount sufficient to initiate the lactone polymerization to form the macromer. It is most preferred to use a cyclic or acyclic oxonium salt which may be secondary or tertiary, for example, an oxonium salt selected from the group consisting of triethyloxonium hexafluorophosphate, triethyloxonium hexafluoroantimonate, triethyloxonium hexafluoroarsenate, triethyloxonium hexachloroantimonate, and triethyloxonium tetrafluoroborate. A trialkyloxonium or other oxonium salt of the $HMF_6$ acid is prepared as described in U.S. Pat. No. 3,585,227 and U.S. Pat. No. Re 31,577 the disclosures of which are incorporated by reference thereto as if fully set forth herein.

The amount of catalyst used has very little effect on the mol wt of the macromer formed, but affects the rate, which in turn affects the temperature of the reaction. The amount used is in the range from about 0.001 part to about 3 parts per 100 parts by wt of lactone monomers, and more preferably from about 0.1 to about 1 part, being generally sufficient. It is desirable, both for economic reasons and for control of the polymerization, to keep the amount of catalyst used as low as possible.

If the lactone and the alcohol are not mutually soluble, or soluble in a mutual co-solvent, the polymerization will not proceed satisfactorily. The higher the solubility, generally the better the polymerization reaction. The reaction is most preferably carried out in a bulk polymerization in a simple and convenient manner.

Typically, the lactone (L) and the moisture-free alcohol I, are charged to a jacketed glass-lined reactor provided with a mechanical agitator and fitted with a thermoprobe and condenser. The reactor is purged with nitrogen and warmed to the polymerization temperature. Under nitrogen, sieve dried caprolactone (CPL) and 2-hydroxyethyl acrylate (HEA) are charged to the reactor and brought to 35°-50° C. The catalyst, for example, triethyloxonium hexafluorophosphate (TEOP) dissolved in methylene chloride is dripped in and the temperature of the reaction mass is controlled to provide a satisfactory rate of polymerization, by raising or lowering the temperature of the circulating medium in the jacket, the rate being followed by measuring total solids.

Though the polymerization is preferably carried out at a temperature in the range from about 25°-50° C., some polymerizations proceed satisfactorily as as low as 0° C., or lower, and others at as high as 90° C. Upon completion, the polymerization is terminated with aqueous sodium bicarbonate solution, and an antioxidant such as Goodrite$^R$ 3125 is added, and the temperature of the mixture raised to about 50° C. and maintained for about an hour. The macromer is separated from the aqueous phase and washed with distilled water at room temperature to remove sodium carbonate and deactivated catalyst. Unreacted monomer, if any, may be removed by distillation under vacuum in the presence of an adequate amount of a suitable free radical polymerization inhibitor such as monoethyl ether of hydroquinone (MEHQ).

The conversion to the macromer and its mol wt are controlled by the ratio of the monomer to the alcohol, according to the following equation:

$$Mn = \left[ \frac{\text{Monomer, g}}{\text{Alcohol, g}} + 1 \right] \times \text{mol wt of alcohol} \times \% \text{ total solids}$$

About 0.1–2.0 parts of TEOP is used per 100 parts of monomer. The amount of sodium bicarbonate used as a short-stop is about three times the amount of TEOP. The amount of antioxidant added is about 0.2% by wt of the macromer. It is essential that all reactants be moisture-free because each molecule of water, if present, will initiate a polymer terminated with OH groups at both ends of the chain.

In Table I herebelow, is set forth the results of each of 8 runs for 8 examples in which the ratio of CPL/HEA is varied from 1 to 27 to demonstrate the dependence of the molecular weight of the macromer on the ratio used, and the conversion obtained. The higher the ratio and conversion, the higher the molecular weight. The macromers obtained are low melting paste or solids having a glass transition temperature Tg lower than about $-50°$ C.

The macromer is characterized by gel permeation chromatography (GPC) analysis at 40° C. using a Water's GPC Model 200 instrument with columns packed with Styragel. THF is used as carrier solvent. All mol wts are calibrated relative to polystyrene and do not correlate well with the actual mol wt. GPC results show the absence of cyclic oligomers amongst the macromer of CPL. Macromers of CPL are formed with substantially uniform mol wt distribution such tat the ratio of the weight average mol wt (Mw) to the number of average mol wt (Mn) is not substantially above about 5, and those formed in examples 1–8 have Mw/Mn in the range of 1.7 to 2.5; the higher the mol wt, the broader the distribution. No high mol wt tail is observed in the GPC curves indicating that no significant amount of macromer is crosslinked prematurely by thermal polymerization of the acrylic head group during the polymerization of CPL, or during the subsequent work-up steps.

FT infrared spectra were recorded with a Nicolet 7199 spectrometer. Samples were prepared by applying a thin coat of macromer on a KBr crystal. FT infrared spectra of the macromers show characteristic absorptions at 3430–3500 cm$^{-1}$ for the terminal OH group, and at 1602 and 1640 cm$^{-1}$ as a doublet for the conjugated C=C stretchings of the terminal acrylic group. The characteristic absorption of the CPL polymer backbone show at 2945 and 2855 cm$^{-1}$ for the C-H stretchings, at 1246, 1196 and 1167 cm$^{-1}$ for the C-O single bond stretchings, and at 1724 cm$^{-1}$ for the strong caarbonyl stretching.

Proton NMR spectra were obtained at 200.13 MHz in chloroform-d at 30° C. using a Bruker WH-200 spectrometer. The proton NMR spectra of macromers show characteristic chemical shifts at 6.4(d), 6.2(m), 5.9(d) ppm for the acrylic group, and at 4.3(m) ppm for the ethylene oxide unit of the terminal acryloylethyl group; and at 3.6(t) ppm for the protons of the methylene group of the repeating CPL units adjacent to the terminal OH group. The proton NMR spectra of macromers also show characteristic chemical shifts at 4.06(t, 2H), 2.30 (t, 2H), 1.65(p, 4H), and 1.45 (p, 2H) ppm corresponding to the repeating units of the CPL polymer backbone.

Carbon-13 NMR spectra were obtained at 20.1 MHz. using a Bruker WP-80 spectrometer. Macromers were examined as a 20 wt% solution in benzene-d$_6$ or chloroform-d with internal tetramethylsilane reference at 30° C. The carbon-13 NMR spectra show characteristic chemical shifts of the terminal acryloylethyl group at 129 and 132 ppm for the olefinic carbons, at 166 ppm for the carbonyl carbon, arid at 62 ppm for the carbons of the ethylene oxide unit. The carbon-13 NMR spectra also show characteristic chemical shifts of the CPL polymer backbone at 64, 34, 29, 26 and 25 ppm for the carbons of the methylene carbons, and at 174 ppm for the carbonyl carbon. The spectra of the macromers further show at 62 ppm for the methylene carbon of the repeating units adjacent to the terminal hydroxyl group, and at 33 ppm for the methylene carbon of the repeating units adjacent to the terminal acryloylethyl group.

Mass spectra were obtained with a Varian MAT 311A mass spectrometer in the field desorption mode. Samples were dissolved in either methanol or THF. The solution was then saturated with solid LiBr so that the lithiated
molecular ions [MLi]$^+$ were produced during analysis. FD mass spectra show a series of predominant species with mol wts of $116+114$ m corresponding to formula [HEA+(CPL)$_m$] for the macromer of CPL polymers.

Hydroxyl number (OH No.) was determined by acetylation with an acetyl anhydride-pyridine mixture according to ASTM D-4274 procedure and the end point is determined by automatic titration. The OH No. is defined as the milligram equivalent of KOH per gram of the macromer, where a mole of KOH is equivalent to one mole of OH group.

The vinyl equivalent weight (VEW) was determined based on the morpholine method according to a procedure described by F. E. Critchfield, et al in *Anal. Chem.* 28, 76 (1956). Attempts to determine the olefinic unsaturation by the Wijs iodine method (ASTM method D-460) were unsuccessful. The close match of mol wts calculated by the OH NO. and VEW, as evidenced in Table I, in combination with the FT-infrared and proton and carbon-13 NMR spectra strongly suggest that the macromer contains one OH group and one acryloylethyl group per polymer chain. The structure of the macromers of Examples 1–8 is also strongly supported by the integration of proton NMR spectra of the macromer for the terminal end groups and best represented by the structure:

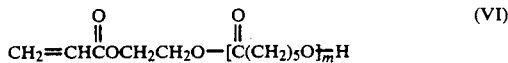

$$CH_2=CHCOCH_2CH_2O-[C(CH_2)_5O]_{\overline{m}}H \quad (VI)$$

As taught by Okitsu and Watanabe in UK Patent Application No. 2,101,121, the amount of byproduct ethylene glycol diacrylate (EGDA) in the macromer of PCL is a good indication of the extent of an undesirable interesterification reaction. As seen in Table I, the amount of EGDA, determined by reverse-phase liquid chromatography, is in the range of 0.0009–0.046 wt %. It is nearly 10 times lower than in the macromers prepared by the improved process using SnCl$_2$ as a catalyst, as shown in examples 1–3 of the
aforesaid Okitsu et al reference. The EGDA in my macromer is an order of magnitude lower than that found in commercially available macromers of CPL, the EGDA contents of which are as follows:

| Tradename | Supplier | EGDA, wt % |
|---|---|---|
| Tone M-100 | Union Carbide Corp. | 1.08 |
| Placcel FA-2 | Daicel Chemical | 0.80 |

-continued

| Tradename | Supplier | EGDA, wt % |
|---|---|---|
| Placcel FA-4 | Daicel Chemical | 0.26 |

(IX)

$$CH_2=CHCOCH_2CH_2O-[C(CH_2)_5O]_m\text{-b-(PolyEt)}-OH$$

TABLE I

| EXAMPLE | 1 | 2 | 3 | 4 | 5 | 6 | 7 | 8 |
|---|---|---|---|---|---|---|---|---|
| CPL wt., g | 500.00 | 598.00 | 114.00 | 748.00 | 2000.00 | 1000.00 | 1500.00 | 2000.00 |
| moles | 4.39 | 5.25 | 1.00 | 6.56 | 17.54 | 8.77 | 13.16 | 17.54 |
| HEA wt., g | 500.00 | 162.00 | 19.20 | 87.00 | 215.00 | 85.00 | 92.00 | 75.00 |
| moles | 3.52 | 1.14 | 0.14 | 0.61 | 1.51 | 0.60 | 0.65 | 0.53 |
| Monomer/Modifier (molar) | 1.02 | 3.76 | 6.04 | 8.75 | 9.47 | 11.97 | 16.59 | 27.13 |
| TEOP, g | 4.00 | 3.00 | 1.50 | 2.40 | 6.00 | 2.50 | 5.00 | 8.00 |
| wt. % | 0.40 | 0.39 | 1.13 | 0.29 | 0.27 | 0.29 | 0.31 | 0.39 |
| Pzn. Temp., C. | 45 | 50 | 35 | 35 | 42 | 35 | 35 | 42 |
| Pzn. Time, hr. | 22 | 7 | 6 | 4 | 5 | 5 | 6 | 6 |
| Conversion, % | 70 | 83 | 93 | 85 | 82 | 81 | 82 | 80 |
| Hydroxyl No by titration | 135 | 76 | 47 | 54 | 44 | 42 | 24 | 18 |
| Mn from OH Number (titration) | 415 | 738 | 1194 | 1039 | 1264 | 1336 | 2338 | 3061 |
| from VEW by titration | 395 | 803 | 1285 | 1324 | 1341 | 1481 | 2870 | 2613 |
| Ethylene Glycol Diacrylate, wt % % | | | | 0.046 | 0.044 | 0.022 | | 0.009 |

The (meth)acryloyl polylactone macromer may be formed with more than one lactone (L) in a manner analogous to that used for the foregoing examples, to form macromers of random copolymers of the lactones used. The (meth)acryloyl macromer of at least one polylactone may also be used as the propagator to form block copolymers of lactone-b-lactone or lactone-b-ether by the action of the same cationic ring-opening catalysts identified hereinabove, under analogous, mild reaction conditions.

When the (meth)acryloyl-functional macromer of at least one polylactone is used as propagator, one can prepare macromers of block copolymers of lactone-b-lactone having the structure

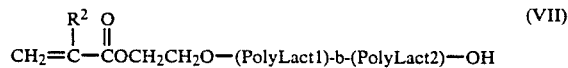

(VII)

$$CH_2=C(R^2)-COCH_2CH_2O-(PolyLact1)\text{-b-}(PolyLact2)-OH$$

when different lactones are sequentially polymerized; or, of lactone-b-ether having the general structure

(VIII)

$$CH_2=C(R^2)-COCH_2CH_2O-(PolyLact)\text{-b-}(PolyEt)-OH$$

when a lactone and an alkylene oxide are sequentially polymerized.

Block copolymers having the structure (III) are prepared in which the polyether block has a number average molecular weight up to about 30,000, wherein PolyEt represents at least one cyclic ether such as: (A) a 1,2-epoxide, for example (i) ethylene oxide, propylene oxide and the like; (ii) haloalkyl epoxides, for example, 1-chloro-2,3-epoxypropane (ECH), 3-chloro-4,5-epoxyoctane, and the like; and (iii) aliphatic or aromatic glycidyl ethers, for example, methyl glycidyl ether, ethyl glycidyl ether, phenyl glycidyl ether and the like;

(B) 1,3-epoxide, for example oxetane;
(C) a 1,4-epoxide, for example tetrahydrofuran (THF); and,
(D) a 1,6-epoxide, for example oxepane (OXP).

1,4- and 1,6-epoxides do not homopolymerize but copolymerize with 1,2- or 1,3-epoxides.

For example, the macromer of block copolymer of monoacryloylethyl poly(lactone-b-ether) has the structure wherein m is an integer in the range from 2 to about 500.

Other macromers of block copolymers may be made with a lactone and alkylene oxide of choice, such as caprolactone and propylene oxide, epichlorohydrin or tetramethylene oxide (THF), and any of the following conveniently available alcohols:

methacryloylethyl alcohol, acryloylethyl alcohol, acryloylpropyl alcohol, and acryloylbutyl alcohol.

The terminal OH group of the lactone macromers (LM) and (VI) are in some cases required to be end-capped with an end-capping group so that there is no OH group to interfere with the subsequent utilization (in a reaction or copolymerization) of the double bond of the macromer. The end-capping group is not narrowly critical and a variety of esterification and etherification reactions may be used to cap the terminal OH groups, as for example disclosed in U.S. Pat. Nos. 2,998,409 and 3,507,927; British Patents Nos. 748,856; 848,660; 869,323; 877,256; 911,959; inter alia; or, by reacting with an alkylisocyanate as in British Patent No. 924,259; or, by reacting with diazomethane as in British Patent No. 894,439; or, by reacting with acrylonitrile or trialkylchlorosilane.

The preferred end-capped macromer is represented by the structure $$R-(M)_m-OZ$$ (LMec)

wherein Z is the residue of an end-capping unit selected from the group consisting of $-R^4$,

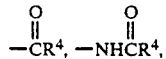

$-CR^4$, $-NHCR^4$, $-WeR_3^4$, $-CH_2CH_2CN$, $-SO_3Na$, $-SO_3K$, $-SO_3NH_4$, and the like, wherein $R^4$ is selected from the group consisting of hydrogen, $C_1$-$C_{20}$ alkyl and haloalkyl, and $C_6$-$C_{20}$ aryl and aralkyl.

The macromers of polylactones, end-capped or not end-capped, depending upon its structure, and the length of its chain, may be tailored to provide a wide variety of properties in polymers formed with them in subsequent polymerizations. Such polymerizations include:

1. Grafting the macromer on a polymer by a free radical reaction initiated by an appropriate initiator or by radiation.

2. Forming a comb copolymer by copolymerizing the macromer with a copolymerizable monomer by:
   a. free radical polymerization, or
   b. group transfer polymerization.

Graft copolymers of macromer may be derived by polymerizing a macromer with or without a comonomer of ethylenically unsaturated monomer, onto a polymer backbone initiated by a free-radical or radiation. Graft-polymerization is a well-known art (see for example "Graft Copolymers" by Battaerd, H. A. J. and Tregear, G. W., Interscience Publishers, New York 1967). The graft copolymerization may be effected by any of the conventional techniques of emulsion, bulk, suspension and solution polymerization. Polymerization may be initiated by heat, peroxide, or hydroperoxide decompositon, redox catalysts, or any other free-radical generation, such as by radiation. The chemical nature of the polymer is not critical so long as it contains no groups which inhibit polymerization. However, polymers lacking in reactive groups generally give low yields of grafted material. For many industrial applications, the presence of only 2-5% of graft copolymer is sufficient to improve the physical properties of the unmodified material.

Comb copolymers of macromers of this invention may be derived from a macromer with one or more conventional ethylenically unsaturated monomers. The length to which the backbone is grown may be controlled by conventional means to provide the desired mol wt of the comb copolymer. It will be recognized that the length of each pendant polylactone chain is fixed by the mol wt of the macromer. The relative molar amount of the lactone macromer to a copolymerizable monomer will preferably range from about 3(macromer):1 (monomer) to about 1(macromer):1000 (monomer). When only macromer is homopolymerized the comb homopolymer formed has only polylactone pendant chains.

Monomers suitable for forming comb copolymers include:
(i) $C_2$–$C_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, N-vinyl carbazole, and the like;
(ii) $C_8$–$C_{16}$ styryl monomers such as styrene, 4-chlorostyrene, alpha-methyl styrene, and the like;
(iii) alpha,beta-ethylenically unsaturated carboxylic acids having from 3 to 8 carbon atoms, and derivatives thereof selected from the group consisting of esters of $C_1$–$C_{20}$ alcohols such as ethyl acrylate, ethyl methacrylate, glycidyl acrylate, butyl acrylate; acrylamide and amides of $C_1$–$C_{20}$ amines such as N,N-dimethylacrylamide; and, metal salts such as sodium acrylate;
(iv) $C_4$–$C_8$ diene monomers such as butadiene and isoprene; and,
(v) $C_5$–$C_{10}$ allylically unsaturated monomers such as allyl acetate, and diallylphthalate.

A preferred comb copolymer is made with a lactone macromer which contains the (meth)acryloyl head, and, one or more of the copolymerizable monomers is preferably selected from (i)–(v), and more preferably from (i)–(iv). Free-radical chain polymerization, commonly used in the art, as described in "Encyclopedia of Polymer Science and Technology" Vol. 7, Interscience Publishers, New York (1967), is preferred for all the polymerizations. It is typically carried out with a free-radical initiator and can be carried out in bulk, mass, solution, slurry emulsion, or dispersion polymerization.

When the comb copolymers of macromers are to be made by group transfer polymerization as described in U.S. Pat. Nos. 4,417,034 and 4,508,800, the preferred lactone macromer contains a methacryloyl head, as is also the case when only a monomer from (iii) is used.

When used as a comonomer, a macromer of this invention may serve as an internal non-extractable plasticizer, compatibilizer, or impact-modifier for many plastics such as "PVC", poly(vinyl chloride). Because polylactones are known to be compatible with many synthetic resinous materials, copolymers made from my macromers are also useful as modifiers to improve heat distortion temperature (HDT), and processability. Pendant polylactone chains of the copolymer of the macromer can be used as the compatibilizing agent to compatibilize two incompatible polymers. For example, elastomeric copolymers of macromer and butyl acrylate or ethyl acrylate are impact modifiers for PVC and nylon; non-elastomeric copolymers of macromer and alpha-methylstyrene or methylmethacrylate are useful to improve the HDT of PVC.

Comb polymers formed with the macromer, and, an olefinically unsaturated monomer which provides a rubbery phase, such as ethyl acrylate, butyl acrylate or butadiene, are particularly useful as modifiers in numerous commercially available polymers such as PVC and chlorinated PVC, poly(methylmethacrylate) and other polyesters, polycarbonates, polyacetals, and nylons, inter alia; in copolymers of ethylene/vinyl acetate, styrene/acrylonitrile; and in acrylonitrile/butadiene/styrene (ABS) terpolymers.

The comb polymers may also be used to improve the physical properties of numerous commercially important polyblends such as PVC/ABS; ABS/polcarbonate; ABS/nylon; PVC/acrylonitrile-butadiene copolymer; and the like.

Macromers of this invention may also be used for the preparation of radiation-curable polyurethanes as described in U.S. Pat. Nos. 3,850,770; 4,377,679 and 4,552,932. Radiation curable polyurethanes are useful in coating adhesives, inks, printing plates and binders.

Preparation of acryloyl terminated macromer of block copolymer of ester-ether:

In the following illustrative example, an acryloyl-terminated macromer of block copolymer of ester-ether is prepared by polymerization of 250 g (2.91 mole) CPL, and 100 g (0.11 mole) of epichlorohydrin, catalyzed with 1.0 g (0.28 wt %) TEOP. After 6 hr at 85% conversion, polymerization was terminated as before, the macromer separated from the aqueous phase and washed twice with a mixture of 10/90 by wt methanol/water at room temperature to remove unreacted monomer and catalyst residues. The polymer was dried at 55° C. under vacuum.

The macromer of block copolymer of ester-ether obtained has a mol wt of 2550 (calculated from a OH number of 22). The weight ratio of ester/ether blocks in the macromer is about 2.1.

Having thus provided a general discussion, and a specific illustration of the best mode for preparing a macromer of polylactone, of macromers of block copolymers thereof, and comb copolymers made with the macromers, and described specific macromers formed using the TAO catalyst, it is to be understood that no undue restrictions are to be imposed by reason thereof, except as provided by the following claims.

I claim:

1. A process for the manufacture of a polylactone macromer having an ethylenically unsaturated functional group near one end and a hydroxyl group at the other, comprising, polymerizing (A) a cationically ring-openable lactone having the structure:

$$R^1CH-(CR^1_2)_n-\underset{\underset{O}{|}}{C}=O \qquad (L)$$

wherein, n is an integer chosen from 1, 3, 4 and 5; $R^1$ is a group selected from hydrogen, $C_1-C_{20}$ alkyl, cycloalkyl, alkoxy and phenyl, and the number of $R^1$ groups which are H is at least (n+2); and, (B) an ethylenically unsaturated primary or secondary (meth)acryloyl alcohol wherein the ethylenic unsaturation 3 is adjacent a carbonyl group as in the structure $$CH_2=\underset{\underset{R^2}{|}}{C}-\underset{\underset{O}{||}}{C}O-R^3-OH$$

wherein $R^2$ is H or methyl;

$R^3$ is selected from the group consisting of branched or linear alkylene, haloalkylene, alkoxyl, haloalkoxyl, each $C_1-C_{20}$, aralkylene, haloaralkylene, aralkoxyl, and haloaralkoxyl, each $C_7-C_{20}$; and, (C) an oxonium salt cationic initiator while maintaining a temperature in the range from about 10° C. to about 80°;

so as to produce a macromer having the structure $$R-(M)_m-OH \qquad (LM)$$

wherein R represents the residue of said alcohol having a (meth)acryloyl group,

M represents the polyester repeating unit of at least one said lactone which is ring-opened, and, m represents an integer in the range from 2 to about 500.

2. The process of claim 1 wherein said lactone is selected from the group consisting of epsilon-caprolactone, beta-propiolactone, beta-butyrolactone, and delta-valerolactone.

3. The process of claim 1 wherein said (meth)acryloyl alcohol is selected from the group consisting of 2-hydroxyethyl (meth)acrylate, hydroxypropyl (meth)acrylate, and 4-hydroxybutyl (meth)acrylate.

4. The process of claim 1 wherein said oxonium salt is a trialkyl oxonium salt selected from the group consisting of triethyloxonium hexafluorophosphate, triethyloxonium hexafluoroantimonate, triethyloxonium hexafluoroarsenate, triethyloxonium hexachloroantimonate, and triethyloxonium tetrafluoroborate, wherein alkyl is lower $C_1-C_6$ alkyl.

5. The process of claim 1 including the additional step of polymerizing (a) said macromer (LM) functioning as a propagator, with (b) an alkylene oxide, in the presence of a sufficient amount for the purpose, of (c) an oxonium salt cationic initiator, while maintaining a temperature in the range from about 10° C. to about 80°;

to form a macromer block copolymer of ester-b-ether as an essentially linear polylactone macromer blocked to a polyether, said macromer of a block copolymer having (meth)acrylic and OH chain ends as in the structure $$CH_2=\underset{\underset{R^2}{|}}{C}-\underset{\underset{O}{||}}{C}O-R^3\text{-(PolyLact)-b-(PolyEt)-OH}$$

wherein,

PolyLact represents a polymer chain of from 2 to about 300 ring-opened lactone units forming a polylactone; and, PolyEt represents a polymer chain of from 2 to about 300 alkylene oxide units forming a polyether;

said macromer of block copolymer having substantially uniform molecular weight distribution such that its ratio of Mw/Mn is not above about 5.0.

6. The process of claim 5 wherein said (PolyEt) in said macromer of block copolymer is the residue of a $C_2-C_6$ alkylene oxide or haloalkylene oxide polymer selected from the group consisting of poly(ethylene oxide), poly(propylene oxide) and poly(epichlorohydrin).

7. The process of claim 5 wherein said lactone is selected from the group consisting of epsilon-caprolactone, beta-propiolactone, beta-butyrolactone, and delta-valerolactone.

8. The process of claim 5 wherein said (meth)acryloyl alcohol is selected from the group consisting of 2-hydroxyethyl (meth)acrylate, hydroxypropyl (meth)acrylate, and 4-hydroxybutyl (meth)acrylate.

9. The process of claim 5 wherein said oxonium salt is a trialkyl oxonium salt selected from the group consisting of triethyloxonium hexafluorophosphate, triethyloxonium hexafluoroantimonate, triethyloxonium hexafluoroarsenate, triethyloxonium hexachloroantimonate, and triethyloxonium tetrafluoroborate, wherein alkyl is lower $C_1-C_6$ alkyl.

10. The process of claim 1 including the additional step of polymerizing (a) said macromer (LM) of a first lactone (L) functioning as a propagator, with (b) another lactone (L), in the presence of a sufficient amount for the purpose, of (c) an oxonium salt cationic initiator, while maintaining a temperature in the range from about 10° C. to about 80°;

to form an essentially linear macromer of block copolymer of ester-b-ester, said macromer of block copolymer having (meth)acrylic and OH chain ends as in the structure $$CH_2=\underset{\underset{R^2}{|}}{C}-\underset{\underset{O}{||}}{C}O-R^3\text{-(PolyLact1)-b-(PolyLact2)-OH}$$

wherein

PolyLact1 represents a polymer chain of from 2 to about 300 ring-opened first lactone units forming a first polylactone; and, PolyLact2 represents a polymer chain of from 2 to about 300 ring-opened second lactone units forming a second polylactone;
said macromer of block copolymer having substantially uniform molecular weight distribution such that its ratio of Mw/Mn is not above about 5.0.

11. The process of claim 10 wherein said lactone is selected from the group consisting of epsilon-caprolactone, beta-propiolactone, beta-butyrolactone, and delta-valerolactone.

12. The process of claim 10 wherein said (meth)acryloyl alcohol is selected from the group consisting of 2-hydroxyethyl (meth)acrylate, hydroxypropyl (meth)acrylate, and 4-hydroxybutyl (meth)acrylate.

13. The process of claim 10 wherein said oxonium salt is a trialkyl oxonium salt selected from the group consisting of triethyloxonium hexafluorophosphate, triethyloxonium hexafluoroantimonate, triethyloxonium hexafluoroarsenate, triethyloxonium hexachloroantimonate, and triethyloxonium tetrafluoroborate, wherein alkyl is lower $C_1$–$C_6$ alkyl.

14. The process of claim 1 including the additional step of polymerizing
    (a) said macromer (LM) functioning as a comonomer, with
    (b) an olefinically unsaturated monomer, in the presence of a sufficient amount for the purpose, of
    (c) a free radical polymerization initiator, while maintaining a temperature in the range from about 10° C. to about 80° C.;
    to form a random comb-shaped copolymer having the structure

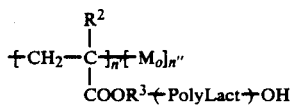

wherein
    $M_o$ represents the olefinically unsaturated monomer;
    $n'$ represents an integer in the range from 1 to about $10^4$, preferably 1–$10^3$ and refers to the number of pendant OH-terminated polyester chains; and,
    $n''$ represents an integer in the range from 1 to about $10^5$.

15. The process of claim 14 wherein said lactone is selected from the group consisting of epsilon-caprolactone, beta-propiolactone, beta-butyrolactone, and delta-valerolactone.

16. The process of claim 14 wherein said (meth)acryloyl alcohol is selected from the group consisting of 2-hydroxyethyl (meth)acrylate, hydroxypropyl (meth)acrylate, and 4-hydroxybutyl (meth)acrylate.

17. The process of claim 14 wherein said oxonium salt is a trialkyl oxonium salt selected from the group consisting of triethyloxonium hexafluorophosphate, triethyloxonium hexafluoroantimonate, triethyloxonium hexafluoroarsenate, triethyloxonium hexachloroantimonate, and triethyloxonium tetrafluoroborate, wherein alkyl is lower $C_1$–$C_6$ alkyl.

18. The process of claim 1 including the additional step of polymerizing
    (a) said macromer (LM) functioning as a comonomer, with
    (b) an olefinically unsaturated monomer, in the presence of a sufficient amount for the purpose, of
    (c) a free radical polymerization initiator, while maintaining a temperature in the range from about 10° C. to about 80° C.;
    to form a macromer block copolymer having the structure

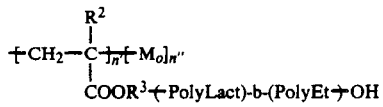

wherein
    $M_o$ represents the olefinically unsaturated monomer;
    $n'$ represents an integer in the range from 1 to about $10^4$, preferably 1–$10^3$ and refers to the number of pendant OH-terminated polyester chains; and,
    $n''$ represents an integer in the range from 1 to about $10^5$.

19. The process of claim 18 wherein said olefinically unsaturated monomer is selected from the group consisting of
    (i) $C_2$–$C_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, N-vinyl carbazole, and the like;
    (ii) $C_8$–$C_{16}$ styryl monomers such as styrene, 4-chlorostyrene, alpha-methyl styrene, and the like;
    (iii) alpha,beta-ethylenically unsaturated carboxylic acids having from 3 to 8 carbon atoms, and derivatives thereof selected from the group consisting of esters of $C_1$–$C_{20}$ alcohols such as ethyl acrylate, ethyl methacrylate, glycidyl acrylate, butyl acrylate; acrylamide and amides of $C_1$–$C_{20}$ amines such as N,N-dimethylacrylamide; and, metal salts such as sodium acrylate;
    (iv) $C_4$–$C_8$ diene monomers such as butadiene and isoprene; and,
    (v) $C_5$–$C_{10}$ allylically unsaturated monomers such as allyl acetate, and diallylphthalate.

20. The process of claim 18 wherein said lactone is selected from the group consisting of epsilon-caprolactone, beta-propiolactone, beta-butyrolactone, and delta-valerolactone.

21. The process of claim 18 wherein said (meth)acryloyl alcohol is selected from the group consisting of 2-hydroxyethyl (meth)acrylate, hydroxypropyl (meth)acrylate, and 4-hydroxybutyl (meth)acrylate.

22. The process of claim 18 wherein said oxonium salt is a trialkyl oxonium salt selected from the group consisting of triethyloxonium hexafluorophosphate, triethyloxonium hexafluoroantimonate, triethyloxonium hexafluoroarsenate, triethyloxonium hexachloroantimonate, and triethyloxonium tetrafluoroborate, wherein alkyl is lower $C_1$–$C_6$ alkyl.

23. A polylactone macromer having a (meth)acrylol group at one end and a hydroxyl group at the other, formed by polymerizing
    (A) a cationically ring-openable lactone having the structure $$R^1CH-(CR^1_2)_n-C=O \atop \underline{\qquad\qquad}O \qquad (L)$$

wherein, n is an integer chosen from 1, 3, 4 and 5;

$R^1$ is a group selected from hydrogen, $C_1$-$C_{20}$alkyl, cycloalkyl, alkoxy and phenyl, and the number of $R^1$ groups which are H is at least (n+2); and, (B) a primary or secondary (meth)acryloyl alcohol wherein the ethylenic unsaturation is adjacent a carbonyl group said alcohol represented by the structure $$\begin{array}{c} R^2 \\ | \\ CH_2=C-CO-R^3-OH \end{array}$$

wherein $R^2$ is H or $CH_3$;

$R^3$ is selected from the group consisting of branched or linear alkylene, haloalkylene, alkoxyl, haloalkoxyl, each $C_1$-$C_{20}$, aralkylene, haloaralkylene, aralkoxyl, and haloaralkoxyl, each $C_7$-$C_{20}$; in the presence of an effective amount of (C) an oxonium salt cationic initiator while maintaining a temperature in the range from about 10° C. to about 80° C.;

so as to produce a macromer having the structure $$R-(M)_m-OH \qquad (LM)$$

wherein R represents the residue of said alcohol having a (meth)acryloyl group,

M represents the polyester repeating unit of at least one said lactone which is ring-opened, and, m represents an integer in the range from 2 to about 500;

said macromer being formed essentially free of di(meth)acrylic species.

24. A random comb-shaped copolymer of a polylactone macromer having a (meth)acrylol group at one end and a hydroxyl group at the other, said comb-shaped copolymer having the structure $$\begin{array}{c} R^2 \\ | \\ \{CH_2-C\}_{n'}\{M_o\}_{n''} \\ | \\ COOR^3\{PolyLact\}OH \end{array}$$

wherein $M_o$ represents the olefinically unsaturated monomer;

$R^2$ is H or $CH_3$;

$R^3$ is selected from the group consisting of branched or linear alkylene, haloalkylene, alkoxyl, haloalkoxyl, each $C_1$-$C_{20}$, aralkylene, haloaralkylene, aralkoxyl, and haloaralkoxyl, each $C_7$-$C_{20}$;

PolyLact represents a polymer chain of from 2 to about 300 ring-opened lactone units of at least one lactone;

n' represents an integer in the range from 1 to about $10^4$, preferably 1-$10^3$ and refers to the number of pendant OH-terminated polyester chains; and, n" represents an integer in the range from 1 to about $10^5$; said comb copolymer formed by polymerizing (a) a macromer having the structure $$\begin{array}{c} R^2 \quad O \\ | \quad \| \\ CH_2=C-CO-R^3\text{-(PolyLact)-OH} \end{array}$$

said macromer having substantially uniform molecular weight distribution such that its ratio of Mw/Mn is not above about 5.0; and, (b) an olefinically unsaturated monomer, in the presence of a sufficient amount for the purpose, of (c) a free radical polymerization initiator, while maintaining a temperature in the range from about 10° C. to about 80° C.

25. A comb-shaped block copolymer of polylactone-b-polyether said block copolymer having a (meth)acrylol group at one end and a hydroxyl group at the other, said comb-shaped block copolymer having the structure $$\begin{array}{c} R^2 \\ | \\ \{CH_2-C\}_{n'}\{M_o\}_{n''} \\ | \\ COOR^3\{PolyLact\}\text{-b-}(PolyEt)OH \end{array}$$

wherein $M_o$ represents the olefinically unsaturated monomer;

$R^2$ is H or $CH_3$;

$R^3$ is selected from the group consisting of branched or linear alkylene, haloalkylene, alkoxyl, haloalkoxyl, each $C_1$-$C_{20}$, aralkylene, haloaralkylene, aralkoxyl, and haloaralkoxyl, each $C_7$-$C_{20}$;

PolyLact represents a polymer chain of from 2 to about 300 ring-opened lactone units of at least one lactone;

n' represents an integer in the range from 1 to about $10^4$, preferably 1-$10^3$ and refers to the number of pendant OH-terminated polyester chains; and, n" represents an integer in the range from 1 to about $10^5$; said comb-shaped block copolymer formed by polymerizing (a) a macromer block copolymer having the structure $$\begin{array}{c} R^2 \quad O \\ | \quad \| \\ CH_2=C-CO-R^3\text{-(PolyLact)-b-(PolyEt)-OH} \end{array}$$

and,

PolyEt represents a polymer chain of from 2 to about 300 alkylene oxide units forming a polyether; said macromer of block copolymer having substantially uniform molecular weight distribution such that its ratio of Mw/Mn is not above about 5.0; with (b) an olefinically unsaturated monomer, in the presence of a sufficient amount for the purpose of (c) a free radical polymerization initiator, while maintaining a temperature in the range from about 10° C. to about 80° C.

26. The comb-shaped copolymer of claim 25 wherein said olefinically unsaturated monomer is selected from the group consisting of (i) $C_2$-$C_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, N-vinyl carbazole, and the like;

(ii) $C_8$–$C_{16}$ styryl monomers such as styrene, 4-chlorostyrene, alpha-methyl styrene, and the like;

(iii) alpha,beta-ethylenically unsaturated carboxylic acids having from 3 to 8 carbon atoms, and derivatives thereof selected from the group consisting of esters of $C_1$–$C_{20}$ alcohols such as ethyl acrylate, ethyl methacrylate, glycidyl acrylate, butyl acrylate; acrylamide and amides of $C_1$–$C_{20}$ amines such as N,N-dimethylacrylamide; and, metal salts such as sodium acrylate;

(iv) $C_4$–$C_8$ diene monomers such as butadiene and isoprene; and, (v) $C_5$–$C_{10}$ allylically unsaturated monomers such as allyl acetate, and diallylphthalate.

27. The comb-shaped copolymer of claim 26 wherein said lactone is selected from the group consisting of epsilon-caprolactone, beta-propiolactone, beta-butyrolactone, and delta-valerolactone.

* * * * *